March 20, 1934.    S. DEUTSCH    1,951,968
DEVICE FOR THE TIGHTENING OF RADIATORS
Filed Feb. 27, 1932
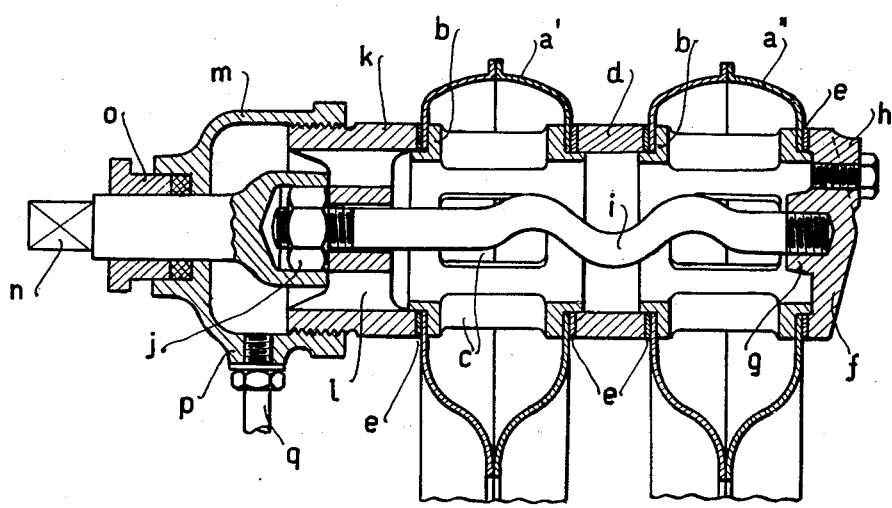
Inventor
Siegfried Deutsch
By Alfred Oberle
attorney Patented Mar. 20, 1934

1,951,968

UNITED STATES PATENT OFFICE 1,951,968

DEVICE FOR THE TIGHTENING OF RADIATORS

Siegfried Deutsch, Vienna, Austria, assignor to firm Vogel & Noot, Vienna, Austria, a firm of Austria Application February 27, 1932, Serial No. 595,634
In Czechoslovakia December 3, 1931

3 Claims. (Cl. 257—161)

This invention relates to a device which serves for the tightening of the joints between the elements of radiators for central heating. The connection of such elements by means of rods passing throughout the entire length of the radiator has not given satisfactory results until now on account of defective tightening in hot condition.

By means of the object of this invention it is easy to safely tighten and keep tight radiators of the type referred to: during the pressure test the strain of the connecting rod is first increased only just to that point where tightening of the joints between the elements of the radiator is obtained at a moderate pressure. Then the pressure is increased until a slight leakage is again observed at one joint or the other, and the strain of the connecting rod is also increased until tightening is again obtained. In this way the pressure and the strain of the connecting rod are increased step by step until the radiator has been found absolutely tight at the prescribed test pressure.

In order to preserve the radiator tight also in hot condition the expansion of the connecting rod caused by heat must be compensated. This connecting rod is surrounded by the heating medium and consequently is raised to higher temperatures than the radiator elements which are cooled by radiation of heat into the room to be heated. Consequently the increase of length of the rod exceeds that of the elements to be connected and loosening of the strain and leakage of the joints which were tight in cold condition has been inavoidable. According to this invention an additional strain is applied to the connecting rod, the amount of which results from the modulus of heat dilatation of the material of the connecting rod, from the maximum temperature of the heating fluid and from the overall length of the radiator. For example at a maximum temperature of 110° C. the nut of a ½" Whitworth thread is to be turned for about the eighth of a turn with a radiator of four elements and about half a turn with twenty to twenty-four elements in order to establish the necessary additional strain.

In the drawing an embodiment of the invention is shown by way of example. The single figure shows a vertical section through the top portions of two adjacent elements of a radiator, with the device according to this invention applied. There are only two elements represented, but it is selfevident that also the connection of more than two elements falls within the scope of this invention. As a rule the number of elements to be connected in one unit will amount to one or several dozens.

In the drawing $a'$ is the one radiator element, $a''$ is the other one, $b$ are hub like parts inserted into the radiator elements and equipped with openings $c$ for the passage of the heating fluid. $d$ is a short tubular piece arranged between the radiator elements and adapted to form a connection between the same, $e$ are washers, $f$ is a cover for the end element $a''$ having a central extension $g$ inside and an eccentric extension $h$ outside. $i$ is the connecting rod which passes through the entire length of the radiator. Instead of the corrugated rod as shown one may use advantageously also a straight one or a helicoidal one. In any case one end of this rod $i$ is fixed to the cover $f$, for example as shown by screwing the same into a threaded central bore in the extension $g$ of this cover. $k$ is a tubular end piece having a small central hub which is connected with the tube $k$ by means of ribs $l$. The free end of the connecting rod $i$ passes slidably through a central bore of this hub and bears a nut $j$. $m$ is a cap screwed onto an external thread of the tube $k$, $o$ is a stuffing box arranged in this cap, $n$ is a spanner adapted to engage with its hollow hexagonal end the nut $j$, $p$ is an extension of the cap $m$ adapted to receive the supply line $q$ for the pressure liquid which comes from any suitable source of pressure, for example from a pressure pump (not shown). The device consisting of the parts $m$, $n$, $o$, $p$, $q$ is only used for the pressure test and is replaced by a simple closed cap screwed onto the thread of the part $k$ when satisfactory tightness of the radiator is obtained.

The working of the device according to this invention will now be clearly understood: the radiator to be subjected to the pressure test is entirely filled with water the pressure of which is increased until water begins to leak out at any of the washers $e$. Now the spanner $n$ is turned and consequently the nut $j$ is tightened until the leakage ceases. Now the pressure is again increased until leakage occurs anew. Then the connecting rod $i$ is again spanned and so on until at the prescribed test pressure just a safe and absolute tightness is obtained and the additional strain for heat compensation is applied: in this moment the necessary strain is established and any undue excess of strain is safely prevented. The cap $m$ with parts $n$, $o$, $p$, $q$ is now replaced by a simple closed cap and the radiator is ready for use.

The eccentrical extension $h$ of the cover $f$ may serve for application of a vent line or valve at the highest available point of the radiator.

Having now described my invention I wish to be understood that I do not limit myself to the embodiment as shown in the drawing but that I am desirous to obtain protection by Letters Patent in the full scope of the following claims.

What I claim is:

1. A device for the purpose described comprising radiator elements, means adapted for passing a fluid between the said radiator elements, means adapted to close endwise the external faces of the said radiator elements, a longitudinal connecting rod passing centrally, transversely through the radiator elements said rod being fixedly attached to the closure means at one end and movably connected to the closure means at the other end and adapted to vary the strain and consequent tightness of the radiator sections, while the unit is in operation.

2. A device as claimed in claim 1 having hub like perforated parts inserted into the said elements, tubular spacing means arranged between two adjacent elements, a closed cap adapted to close the external face of one of the end elements, the connecting rod being fixed at one end to the said cap and adapted to extend through all radiator elements, a tubular end piece adapted to bear at the exterior face of the other end element, a hub rigidly connected with and arranged within the said tubular end piece, a nut adapted to be screwed onto the free end of the said connecting rod and to bear against the external face of the said hub, a cap adapted to be removably fixed at the said tubular end piece, a spanner adapted to pass through the said cap and to engage the said nut, a stuffing box arranged on the said cap and adapted to tighten the said spanner with respect to the said cap and a supply of pressure medium adapted to be connected to one of the said caps.

3. A device as claimed in claim 1 comprising in combination with the other parts enumerated in that claim, an elastic connecting means adapted to yieldably connect the radiator elements.

SIEGFRIED DEUTSCH.